US009399967B2

(12) United States Patent
Ante et al.

(10) Patent No.: US 9,399,967 B2
(45) Date of Patent: Jul. 26, 2016

(54) METHOD AND DEVICE FOR OPERATING A PARTICLE SENSOR

(75) Inventors: Johannes Ante, Regensburg (DE); Markus Herrmann, Regensburg (DE); Andreas Ott, Steinsberg (DE); Willibald Reitmeier, Hohenschambach (DE); Denny Schädlich, Neustadt (DE); Manfred Weigl, Sinzing/Viehhausen (DE); Andreas Wildgen, Nittendorf (DE)

(73) Assignee: Continental Automotive GmbH, Hannover (DE)

( * ) Notice: Subject to any disclaimer, the term of this patent is extended or adjusted under 35 U.S.C. 154(b) by 830 days.

(21) Appl. No.: 13/416,874

(22) Filed: Mar. 9, 2012

(65) Prior Publication Data

US 2012/0255340 A1 Oct. 11, 2012

(30) Foreign Application Priority Data

Mar. 10, 2011 (DE) ........................ 10 2011 013 544

(51) Int. Cl.
*F02D 41/14* (2006.01)
*G01N 27/16* (2006.01)

(52) U.S. Cl.
CPC ......... *F02D 41/1466* (2013.01); *F01N 2560/05* (2013.01)

(58) Field of Classification Search
CPC .............. F02D 41/1466; F02D 41/029; F02D 2200/0812; F01N 9/002; F01N 2560/05; F01N 11/00
See application file for complete search history.

(56) References Cited

U.S. PATENT DOCUMENTS

| | | | | |
|---|---|---|---|---|
| 2003/0196499 | A1* | 10/2003 | Bosch et al. | 73/865.5 |
| 2008/0105567 | A1* | 5/2008 | Okayama et al. | 205/775 |
| 2009/0019918 | A1 | 1/2009 | Baars et al. | |
| 2010/0000863 | A1* | 1/2010 | Kondo et al. | 204/406 |
| 2010/0031733 | A1* | 2/2010 | Bollinger et al. | 73/28.04 |
| 2010/0201385 | A1* | 8/2010 | Menil et al. | 324/700 |
| 2012/0288410 | A1* | 11/2012 | Takayanagi | 422/105 |

FOREIGN PATENT DOCUMENTS

| | | | |
|---|---|---|---|
| DE | 10 2007 014 761 | A1 | 10/2008 |
| DE | 10 2007 060 939 | A1 | 6/2009 |
| WO | WO 2011096313 | A1 * | 8/2011 |

* cited by examiner

*Primary Examiner* — Lisa Caputo
*Assistant Examiner* — Punam Roy
(74) *Attorney, Agent, or Firm* — Cozen O'Connor

(57) ABSTRACT

A particle sensor arranged in an exhaust duct such that particles from the exhaust-gas flow accumulate on and/or between at least two sensor electrodes when a voltage greater than a limit voltage is applied between the two sensor electrodes and substantially no particles accumulate if the voltage is lower than the limit voltage. During a first time period, a first voltage greater than the limit voltage is applied between the sensor electrodes. During a second time period, a second voltage, lower than the limit voltage, is applied between the sensor electrodes, and/or the particle sensor is heated to a predefined temperature, such that substantially no particles accumulate on and/or between the at least two sensor electrodes. Following the second time period, a third voltage greater than the limit voltage is applied between the sensor electrodes.

9 Claims, 2 Drawing Sheets

METHOD AND DEVICE FOR OPERATING A PARTICLE SENSOR

BACKGROUND OF THE INVENTION

1. Field of the Invention

The invention relates to a method and a device for operating a particle sensor arranged in an exhaust duct of an internal combustion engine of a motor vehicle having a sensor support. At least two sensor electrodes are arranged on one side of the sensor support and are exposed to an exhaust-gas flow in the exhaust duct.

2. Description of the Related Art

Ever more stringent legal regulations with regard to admissible pollutant emissions of motor vehicles with internal combustion engines make it necessary to keep pollutant emissions during the operation of the internal combustion engine as low as possible. This may firstly be realized by a reduction in the pollutant emissions generated during the combustion of the air/fuel mixture in respective cylinders of the internal combustion engine. Secondly, use is also made of exhaust-gas aftertreatment systems. In the case of diesel engines, exhaust-gas recirculation is one of the most important measures for lowering nitrogen oxide emissions. Soot particle sensors are primarily provided for monitoring soot particle filters. In conjunction with exhaust-gas recirculation, it may nevertheless be advantageous to measure a soot particle concentration of the exhaust gas at other locations in an exhaust tract of the internal combustion engine, for example upstream of the soot particle filter.

DE 10 2007 060 939 A1 discloses a method for operating a particle sensor for determining a particle content in a gas flow, wherein the particle sensor is constructed from at least one electrically insulating support and from at least two electrodes affixed to said support, and wherein, within a measurement interval between two regeneration phases of the particle sensor, a change in resistance and/or a change in impedance between the electrodes is evaluated to determine the particle content. During a measurement interval, the particle sensor is operated in accumulation phases and in measurement phases in cyclic alternation, and that different voltages and/or voltage waveforms are applied to the electrodes during the accumulation phases and the measurement phases.

SUMMARY OF THE INVENTION

An object of one embodiment of the invention is specifying a method and a device for operating a particle sensor, which method and device permit particularly reliable and cheap measurement of a sensor measurement signal.

One embodiment of invention is a method and a corresponding device for operating a particle sensor arranged in an exhaust duct of an internal combustion engine of a motor vehicle. The particle sensor comprises a sensor support with at least two sensor electrodes exposed to an exhaust-gas flow in the exhaust duct and which are arranged on one side of the sensor support and designed such that particles from the exhaust-gas flow accumulate to an appreciable extent on and/or between the at least two sensor electrodes when a voltage greater than a predefined limit voltage is applied between the two sensor electrodes and substantially no particles accumulate if the voltage is lower than the limit voltage. The method comprises, during a predefined first time period, a predefined first voltage greater than a predefined limit voltage is applied between the sensor electrodes. Furthermore, during a predefined second time period, which directly follows the first time period, a predefined second voltage lower than the predefined limit voltage is applied between the sensor electrodes and/or the particle sensor is heated to a predefined temperature, such that substantially no particles from the exhaust-gas flow accumulate on and/or between the at least two sensor electrodes. Following the second time period, a predefined third voltage greater than the predefined limit voltage is applied between the sensor electrodes, and a change in resistance and/or a change in impedance between the sensor electrodes is measured and evaluated.

This advantageously permits temporally directed, demand-oriented measurement usage of the particle sensor. As a result of a very significant reduction in the accumulation rate or an approximate elimination of particle accumulation during the second time period, the particle sensor can remain ready for measurement operation, such that a desired measurement phase can be commenced when required. Furthermore, the particle accumulation on the particle sensor can be controlled, and thereby a measurement sensitivity of the particle sensor predefined as a function of the first and third voltages. The particle sensor can therefore be utilized to measure the particle concentration at different locations of the motor vehicle at which the exhaust gas may have different particle concentrations in each case. For example, the particle sensor may be arranged upstream of the particle filter and/or downstream of the particle filter. The particle filter may be designed as a soot particle filter.

The method according to one embodiment of the invention is preferably carried out temporally between two successive regeneration phases, during each of which a burn-off of particles from the sensor electrodes takes place. The operation of the particle sensor with the first voltage between the two sensor electrodes during the first time period after a regeneration phase has the advantage that, after said first time period, the particle sensor can be in a state in which it is ready for measurement operation, that is to say, during said first time period, particles can accumulate to a sufficient extent on and/or between the sensor electrodes such that, when a predefined measurement voltage is applied, a sensor current which can be reliably evaluated flows between the two sensor electrodes. A higher first voltage can increase the rate of accumulation of the particles and thereby shorten a time period until the particle sensor reaches a measurement-ready state after a regeneration phase. The operation of the particle sensor with the second voltage between the two electrodes during the second time period has the advantage that the particle sensor remains in the state in which it is ready for measurement operation regardless of a concentration of the particles in the exhaust gas. The second voltage may for example have a value of 0 V. When the at least two sensor electrodes are acted on with a potential difference, an electric field is generated between the two sensor electrodes. The electric field exerts a resultant force on the particles, which may be electrically charged. The particles are attracted toward the sensor electrodes and thereby accumulate on these as a particle layer. If the voltage applied between the two sensor electrodes exceeds the predefined limit voltage, particles accumulate to an appreciable extent between and/or on the sensor electrodes, that is to say the number of particles accumulating is greater as a result of the force exerted by the electric field than when a flow passes around the sensor electrodes in the absence of an electric field, such that a change in resistance and/or a change in impedance between the two sensor electrodes can be measured after a predefined accumulation period.

The reduction in the accumulation rate can be achieved through a reduction in the voltage between the two sensor electrodes and/or through heating of the sensor electrodes, because in the case of the particle sensor of said design, the accumulation rate of the particles is dependent on a sensor operating temperature. The sensor electrodes can preferably be heated such that they assume a sensor operating temperature higher than an exhaust-gas temperature of the exhaust gas flowing around the sensor electrodes and lower than a burn-off temperature required for combustion of the soot particles. For example, the temperature to which the particle sensor is heated may have a value of approximately 600° C. For this purpose, the particle sensor may have a heating element arranged for example on a side, which faces away from the sensor electrodes. Other arrangements of the heating element are also possible. For example, if the particle sensor is operated with a sensor operating temperature lower than the exhaust-gas temperature of the exhaust gas flowing around the sensor electrodes, the accumulation rate of the particles may be very high. In contrast, if the particle sensor is operated with a sensor operating temperature approximately equal to the exhaust-gas temperature of the exhaust gas, the accumulation rate of the particles may be lower than in the situation mentioned above. If the particle sensor is operated with a sensor operating temperature which lies above the exhaust-gas temperature of the exhaust gas, the accumulation rate of the particles may be very low or substantially equal to zero.

In one advantageous refinement, a particle concentration in the exhaust gas is determined as a function of the change in resistance and/or the change in impedance between the sensor electrodes.

In a further advantageous refinement, a predefined operating state of the internal combustion engine is detected and the second time period is predefined as a function of an identification of the predefined operating state of the internal combustion engine. This advantageously makes it possible to measure a particle concentration, in particular a soot particle concentration, of the exhaust gas when the internal combustion engine is in a predefined operating state. The measured particle concentration may be evaluated by an engine controller and utilized for control or regulation of an exhaust-gas recirculation system and/or a fuel injection system. The operating state may represent a transition from a part-load operating mode to a full-load operating mode of the internal combustion engine and/or a transition from partial exhaust-gas recirculation to full exhaust-gas recirculation. Alternatively or in addition, the operating state may represent at least one further transition operating state in which the internal combustion engine switches from a first operating state into a second operating state.

In one embodiment, during the first time period, a sensor current that flows between the two sensor electrodes is measured, and the second time period is started when it is identified that the sensor current exceeds a predefined setpoint value. This makes it possible for the sensor current to be reliably measured as early as a very short time after the second time period. Furthermore, the sensor current may be predefined such that, in a further time profile up to the start of a new regeneration phase, a sensor current characteristic has a substantially linear profile with an adequate measurement range. The threshold value may for example have a value in the range from 40 μA to 100 μA.

In one embodiment, at the end of the first time period, a first particle concentration of the exhaust gas in the exhaust duct is determined as a function of a first change in resistance and/or a first change in impedance of the two sensor electrodes, and the change in resistance and/or change in impedance measured after the second time period is corrected as a function of the first particle concentration and the second time period. This has the advantage that the particle concentration can be measured particularly precisely.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention will be explained in more detail below on the basis of the schematic drawings, in which.

Elements of substantially identical design or function are denoted throughout the figures by the same reference symbols.

DETAILED DESCRIPTION OF THE PRESENTLY PREFERRED EMBODIMENTS

Figure 1:
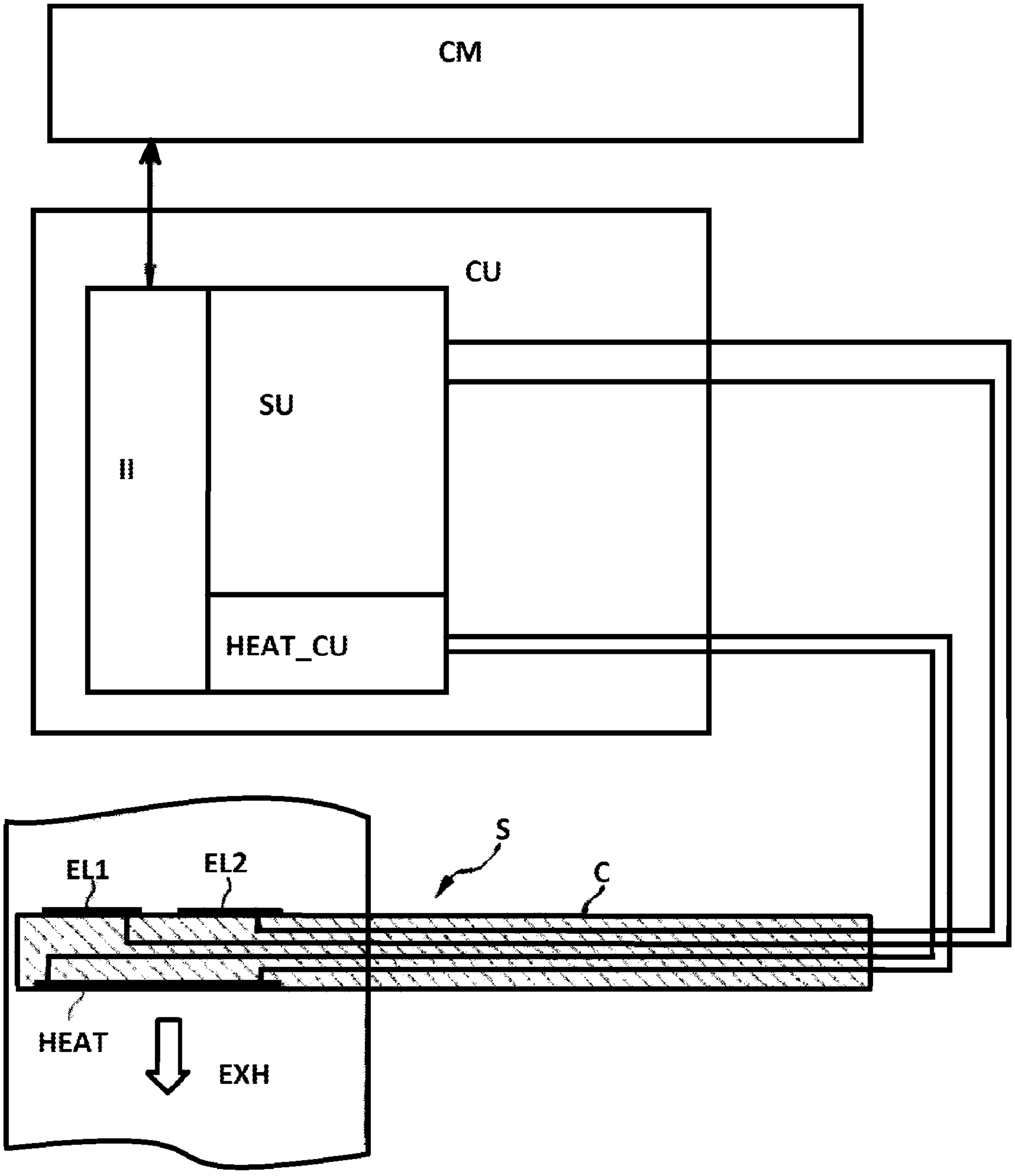
FIG. 1 is a schematic illustration of a particle sensor.

FIG. 1 schematically illustrates a particle sensor S arranged at least partially in an exhaust duct EXH of an internal combustion engine of a motor vehicle. The particle sensor S is preferably arranged upstream of a particle filter of the motor vehicle. The particle sensor S comprises a sensor support C, which is preferably formed as a glass or ceramic support. A first sensor electrode EL1 and a second sensor electrode EL2 are arranged on the sensor support C on one side thereof so as to be exposed to the exhaust-gas flow in the exhaust duct EXH. For better understanding, the direction of the exhaust-gas flow is denoted by an arrow in the exhaust duct EXH in FIG. 1. The particle sensor S is preferably aligned in the exhaust duct EXH such that the first sensor electrode EL1 and the second sensor electrode EL2 face toward the exhaust-gas flow. The sensor electrodes EL1, EL2 are preferably formed as platinum electrodes. Some other alignment of the particle sensor S in the exhaust duct EXH and some other embodiment of the sensor electrodes EL1, EL2 are also conceivable. A heating element HEAT is arranged on a side of the support C that faces away from the sensor electrodes EL1, EL2, of the particle sensor S. Some other arrangement of the heating element HEAT is also possible.

The first sensor electrode EL1 and second sensor electrode EL2 and the heating element HEAT of the particle sensor S are electrically coupled to a control unit CU. The control unit CU comprises a sensor unit SU and a heating element control unit HEAT_CU. Furthermore, the control unit CU has an interface IF designed preferably as a communication interface, for example as a CAN interface coupled to a data network of the motor vehicle. The control unit CU is coupled via the interface IF to a control device CM of the motor vehicle. The control unit CU preferably comprises a processing unit and a data memory on which is stored at least one program executed by the processing unit as a control unit CU. The control unit CU may be referred to as a device for operating a particle sensor S.

The control device CM of the motor vehicle is preferably an engine control device and therefore designed to determine and/or predefine an operating state of the internal combustion engine of the motor vehicle.

The sensor unit SU is designed such that, during a first time period t1, it acts on the first sensor electrode EL1 and second sensor electrode EL2 with a predefined first voltage U1 that is greater than a predefined limit voltage. The particle sensors S is designed such that particles from the exhaust-gas flow accumulate to an appreciable extent on and/or between the at least two sensor electrodes when a voltage greater than the predefined limit voltage is applied between the two sensor electrodes EL1, EL2 and substantially no particles accumulate if the voltage is lower than the limit voltage. When the first sensor electrode EL1 and second sensor electrode EL2 are acted on with the first voltage U1, preferably electrically charged particles, for example soot particles, are attracted and accumulated on and/or between the first sensor electrode EL1 and second sensor electrode EL2.

The sensor unit SU may be designed such that, during the first time period t1, it measures a sensor current IS as a function of the first voltage U1 applied between the two sensor electrodes EL1, EL2 and the accumulated particles on and/or between the first sensor electrode EL1 and second sensor electrode EL2, and detects whether the sensor current IS exceeds a predefined setpoint value.

The sensor unit SU is furthermore designed such that, during a second predefined time period which directly follows the first time period t1, it acts on the sensor electrodes EL1, EL2 with a predefined second voltage U2 lower than the predefined limit voltage, such that substantially no particles accumulate on and/or between the sensor electrodes EL1, EL2.

The sensor unit SU may be designed such that it detects a predefined operating state of the internal combustion engine for example as a function of a signal from the engine controller, and if the sensor unit SU identifies the predefined operating state, it acts on the sensor electrodes EL1, EL2 with a predefined third voltage greater than the predefined limit voltage. The sensor unit SU is furthermore designed such that it measures a sensor current IS as a function of the third voltage applied between the two sensor electrodes EL1, EL2 and the accumulated particles on and/or between the first sensor electrode EL1 and second sensor electrode EL2, and determines an electrical resistance RS between the first sensor electrode EL1 and second sensor electrode EL2 as a function of the third voltage and the sensor current IS. The electrical resistance RS between the first sensor electrode EL1 and second sensor electrode EL2 preferably has a significantly higher resistance value in the case of a regenerated, that is to say cleaned particle sensor S than in the case of a non-cleaned particle sensor S. If particles collect between the first sensor electrode EL1 and second sensor electrode EL2, the value of the electrical resistance RS falls. The electrical resistance RS is thus dependent on a thickness of a particle layer which has accumulated on and/or between the first sensor electrode EL1 and second sensor electrode EL2. However, if the thickness of the particle layer exceeds a limit thickness, a further increase in the thickness of the particle layer does not lead to any further significant change in the electrical resistance RS between the first sensor electrode EL1 and second sensor electrode EL2. The determined resistance RS at the limit thickness of the particle layer can also be referred to as the limit resistance.

In addition to a direct determination of the electrical resistance RS between the first sensor electrode EL1 and second sensor electrode EL2 as a function of the applied voltage between the two sensor electrodes EL1, EL2 and the associated sensor current IS, it is also possible for an ohmic resistance component of an impedance of an overall capacitance to be used as a representation of a particle concentration, wherein the overall capacitance results from the sensor electrodes EL1, EL2 and the particle layer. Here, the first sensor electrode EL1 and second sensor electrode EL2 are preferably coated with an insulating layer comprising glass or aluminum oxide. The first sensor electrode EL1 and second sensor electrode EL2 preferably have capacitive properties, owing to their arrangement on the sensor support C, in the absence of an accumulated particle layer. In the presence of a particle layer which has accumulated on and/or between the coated first sensor electrode EL1 and second sensor electrode EL2, a further capacitance arises, wherein the particle layer can be regarded in each case as a first capacitor electrode, and the first sensor electrode EL1 and second sensor electrode EL2 can be regarded in each case as a second capacitor electrode. The insulating layer is arranged, as dielectric, between the particle layer and the first sensor electrode EL1 and second sensor electrode EL2. The overall capacitance is thus formed by a series connection of a first capacitance resulting from the first sensor electrode EL1 and the particle layer and a second capacitance resulting from the particle layer and the second sensor electrode EL2. Here, the impedance of the overall capacitance is assigned an ohmic resistance component and a complex resistance component, wherein the ohmic resistance component is dependent on the thickness of the particle layer on and/or across the coated first sensor electrode EL1 and second sensor electrode EL2. The particle concentration in the exhaust-gas flow of the motor vehicle can be determined as a function of the determination of a value of the ohmic resistance component.

The sensor unit SU may furthermore be designed such that, at the end of the first time period t1, it determines a first particle concentration of the exhaust gas in the exhaust duct as a function of a first change in resistance and/or a first change in impedance of the two sensor electrodes EL1, EL2, and corrects the change in resistance and/or change in impedance measured after the second time period as a function of the first particle concentration and the second time period.

The heating element control unit HEAT_CU is designed to actuate the heating element HEAT on the particle sensor S. Here, the actuation may take place such that, in a regeneration phase T_R1, T_R2, the accumulated particles on the particle sensor S are burned off, and the particle sensor S is thereby regenerated. Such an actuation of the heating element HEAT preferably takes place when the limit thickness of the particle layer on and/or between the first sensor electrode EL1 and second sensor electrode EL2 is reached or exceeded. For the combustion of the particles, it is necessary for the particle sensor S to be heated to for example 800° C.

Furthermore, the heating element control unit HEAT_CU may be designed to actuate the heating element HEAT on the particle sensor S such that, during the second time period t2, the particle sensor S is heated to a predefined operating temperature, for example 600° C. This has the advantage that, substantially during the second time period t2, no particles accumulate on and/or between the sensor electrodes EL1, EL2, and the particles that have already accumulated are not burned off.

Figure 2:
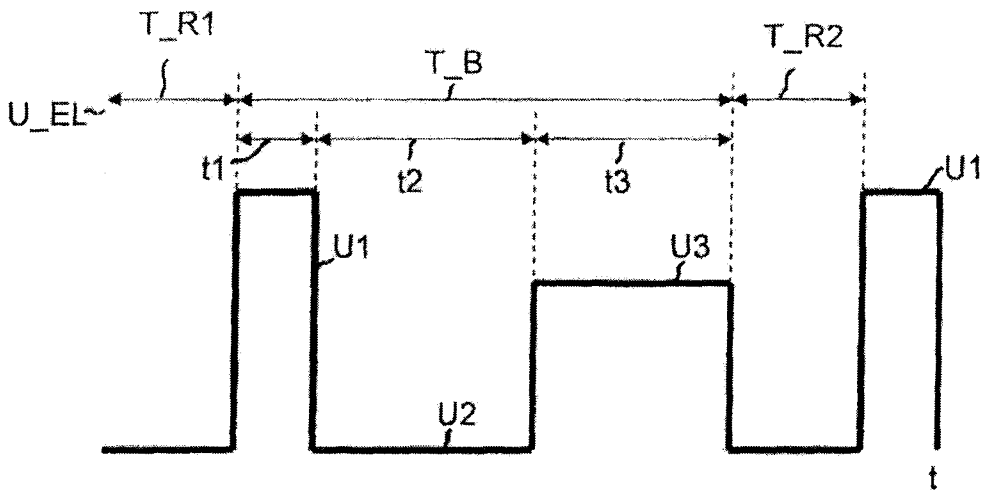
FIG. 2 is a time profile of a voltage applied between the sensor electrodes.

FIG. 2 is a time profile of a voltage U_EL applied between the two sensor electrodes EL1, EL2. FIG. 2 substantially shows a measurement operation interval T_B between a first regeneration phase T_R1 and a second regeneration phase T_R2. During the first time period t1, the two sensor electrodes EL1, EL2 are acted on with a first voltage U1 greater than the limit voltage. The first voltage U1 may have a profile that is constant over time or may have a profile that is variable over time. During the second time period t2, the sensor electrodes EL1, EL2 are acted on with a second voltage U2 lower than the limit voltage. In the example shown in FIG. 2, the second voltage U2 has, by way of example, a value of 0 V. The second voltage U2 may have a profile which is constant over time or a profile which is variable over time.

During a third time period t3, that is to say between the end of the second time period t2 and the start of the second regeneration phase T_R2, the two sensor electrodes EL1, EL2 are acted on with a third voltage greater than the limit voltage. The third voltage U3 may have a profile that is constant over time or a profile that is variable over time. The first voltage U1 and/or third voltage U3 may in each case be predefined as a function of a desired accumulation rate of the particles. The first and third voltages U3 may for example have identical or different voltage values.

It is alternatively also possible that, during the second time period t2, the two sensor electrodes EL1, EL2 are acted on with a fourth voltage greater than the limit voltage, and the particle sensor S is heated such that substantially no further particles accumulate between and/or on the sensor electrodes EL1, EL2. The fourth voltage may have a profile which is constant over time or a profile which is variable over time.

Figure 3:
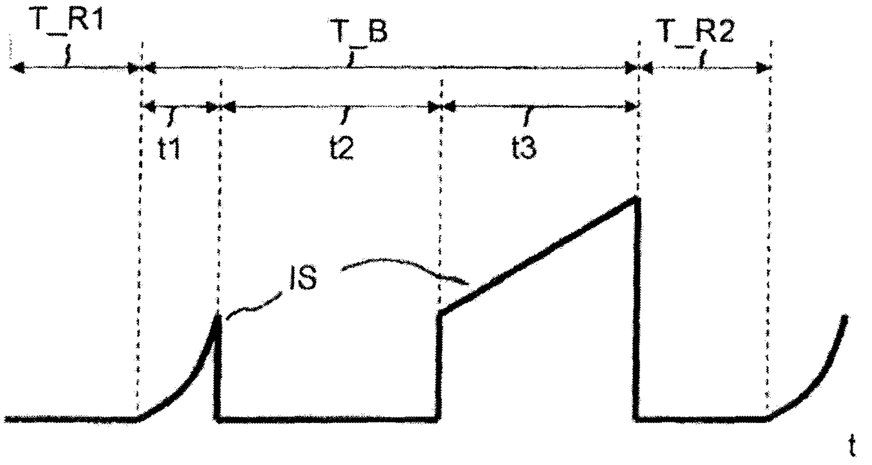
FIG. 3 is a time profile of a sensor current.

FIG. 3 schematically shows a time profile of the sensor current IS. During the first time period t1, the sensor current IS increases. The sensor current IS has for example a non-linear profile during the first time period t1, which may also be referred to as an accumulation phase. During the third time period t3, the sensor current IS may for example have a profile that is approximately linear over time. The second time period t2 may for example be predefined as a function of a detection of a predefined operating state of the internal combustion engine, and therefore in a demand-oriented manner.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a particle sensor arranged in an exhaust duct of an internal combustion engine having a sensor support and at least two sensor electrodes arranged on one side of the sensor support that are exposed to an exhaust-gas flow in the exhaust duct such that particles from the exhaust-gas flow accumulate to an appreciable extent at least one of on and between the at least two sensor electrodes when a voltage greater than a predefined limit voltage is applied between the two sensor electrodes and substantially no particles accumulate if the voltage is lower than the limit voltage, the method comprising:

applying a predefined first constant voltage greater than the predefined limit voltage between the sensor electrodes during a predefined first time period;

applying a predefined second voltage lower than the predefined limit voltage between the sensor electrodes during a predefined second time period which directly follows the first time period such that substantially no particles accumulate at least one of on and between the at least two sensor electrodes;

applying a predefined third variable voltage greater than the predefined limit voltage between the sensor electrodes following the second time period and measuring at least one of a change in resistance and a change in impedance between the sensor electrodes, wherein the predefined third variable voltage is a linearly increasing voltage; and evaluating the at least one of the change in the resistance and the change in the impedance between the sensor electrodes.

2. The method as claimed in claim 1, further comprising determining a particle concentration in the exhaust gas as a function of the at least one of the change in the resistance and the change in the impedance between the sensor electrodes.

3. The method as claimed in claim 2, wherein at an end of the first time period, the particle concentration of the exhaust gas in the exhaust duct is determined as a function of a first change in the at least one of the resistance and the impedance between the sensor electrodes, and at least one of the change in resistance and the change in impedance measured after the second time period is corrected as a function of the particle concentration at the end of the first time period and the second time period, wherein any influence from the particles from the exhaust-gas flow that accumulate at least one of on and between the at least two sensor electrodes during the predefined second time period is minimized.

4. The method as claimed in claim 1, further comprising detecting a predefined operating state of the internal combustion engine, wherein the second time period is predefined as a function of the predefined operating state of the internal combustion engine.

5. The method as claimed in claim 1, further comprising:

heating the particle sensor to a predefined temperature lower than a burn-off temperature required for combustion of the particles, such that substantially no particles from the exhaust-gas flow accumulate at least one of on and between the at least two sensor electrodes during the predefined second time period which directly follows the first time period.

6. A method for operating a particle sensor arranged in an exhaust duct of an internal combustion engine having a sensor support and at least two sensor electrodes arranged on one side of the sensor support that are exposed to an exhaust-gas flow in the exhaust duct such that particles from the exhaust-gas flow accumulate to an appreciable extent at least one of on and between the at least two sensor electrodes when a voltage greater than a predefined limit voltage is applied between the two sensor electrodes and substantially no particles accumulate if the voltage is lower than the limit voltage, the method comprising:

applying a predefined first constant voltage greater than the predefined limit voltage between the sensor electrodes during a predefined first time period;

at least one of:

applying a predefined second voltage lower than the predefined limit voltage between the sensor electrodes during a predefined second time period which directly follows the first time period such that substantially no particles accumulate at least one of on and between the at least two sensor electrodes; and heating the particle sensor to a predefined temperature lower than a burn-off temperature required for combustion of the particles, such that substantially no particles from the exhaust-gas flow accumulate at least one of on and between the at least two sensor electrodes during the predefined second time period which directly follows the first time period;

applying a predefined third variable voltage greater than the predefined limit voltage between the sensor electrodes following the second time period and measuring at least one of a change in resistance and a change in impedance between the sensor electrodes, wherein the predefined third variable voltage is a linearly increasing voltage;

evaluating the at least one of the change in the resistance and the change in the impedance between the sensor electrodes;

measuring a sensor current that flows between the two sensor electrodes during the first time period; and starting the second time period when the sensor current exceeds a predefined threshold value.

7. A device configured to operating a particle sensor arranged in an exhaust duct of an internal combustion engine that includes a sensor support and at least two sensor electrodes arranged on one side of the sensor support exposed to an exhaust-gas flow in the exhaust duct designed such that particles from the exhaust-gas flow accumulate to an appreciable extent at least one of on and between the at least two sensor electrodes when a voltage greater than a predefined limit voltage is applied between the two sensor electrodes and substantially no particles accumulate if the voltage is lower than the limit voltage, wherein the device is configured such that:

during a predefined first time period, the device applies a predefined first constant voltage greater than the predefined limit voltage between the sensor electrodes;

during a second predefined time period which directly follows the first time period, the device applies a predefined second voltage lower than the predefined limit voltage between the sensor electrodes such that substantially no particles accumulate at least one of on and between the at least two sensor electrodes, and following the second time period, the device applies a predefined third variable voltage greater than the predefined limit voltage between the sensor electrodes, wherein the predefined third variable voltage is a linearly increasing voltage, and measures and evaluates at least one of a change in resistance and a change in impedance between the sensor electrodes.

8. The device of claim 7, wherein during the second predefined time period which directly follows the first time period, the device heats the particle sensor with a heater to a predefined temperature lower than a burn-off temperature required for combustion of the particles, such that substantially no particles from the exhaust-gas flow accumulate one of on and between the at least two sensor electrodes.

9. A device configured to operating a particle sensor arranged in an exhaust duct of an internal combustion engine that includes a sensor support and at least two sensor electrodes arranged on one side of the sensor support exposed to an exhaust-gas flow in the exhaust duct designed such that particles from the exhaust-gas flow accumulate to an appreciable extent at least one of on and between the at least two sensor electrodes when a voltage greater than a predefined limit voltage is applied between the two sensor electrodes and substantially no particles accumulate if the voltage is lower than the limit voltage, wherein the device is configured such that:

during a predefined first time period, the device applies a predefined first constant voltage greater than the predefined limit voltage between the sensor electrodes;

during a second predefined time period which directly follows the first time period, the device at least one of:

applies a predefined second voltage lower than the predefined limit voltage between the sensor electrodes such that substantially no particles accumulate at least one of on and between the at least two sensor electrodes, and heats the particle sensor with a heater to a predefined temperature lower than a burn-off temperature required for combustion of the particles, such that substantially no particles from the exhaust-gas flow accumulate one of on and between the at least two sensor electrodes;

following the second time period, the device applies a predefined third variable voltage greater than the predefined limit voltage between the sensor electrodes, wherein the predefined third variable voltage is a linearly increasing voltage, and measures and evaluates at least one of a change in resistance and a change in impedance between the sensor electrodes;

a sensor current that flows between the two sensor electrodes during the first time period is measured; and the second time period is started when the sensor current exceeds a predefined threshold value.

* * * * *